March 24, 1970    C. L. ADAMS ET AL    3,502,530
METHOD OF PRODUCING A FINISHED REINFORCED
EDGE ON FLEXIBLE WEBS OR SHEETS
Filed Jan. 14, 1966    2 Sheets-Sheet 1
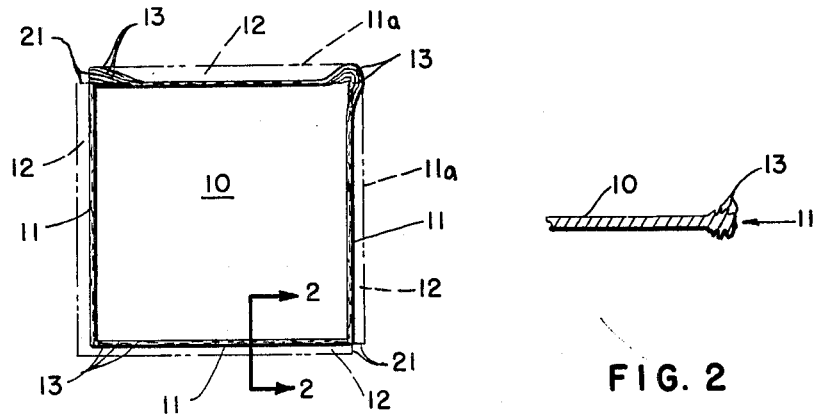
FIG. 1
FIG. 2
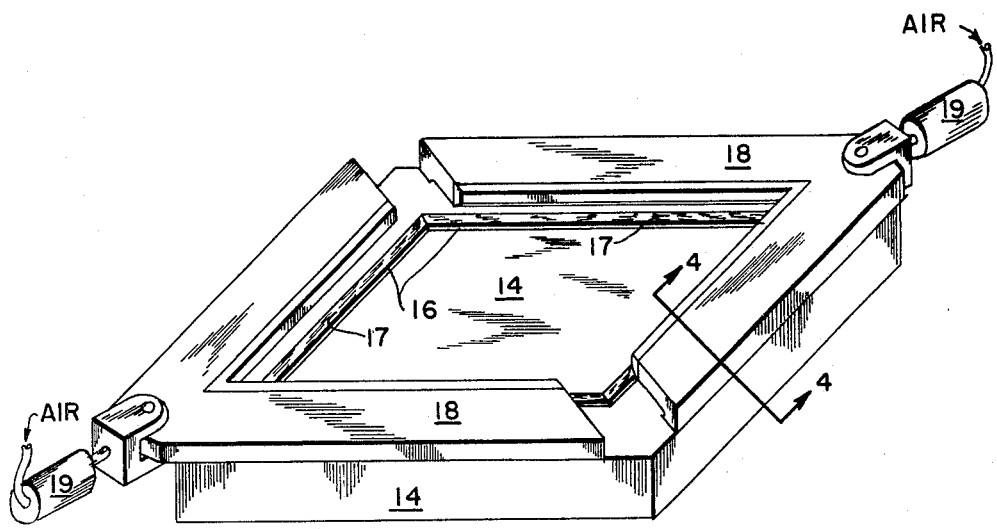
FIG. 3
INVENTORS
CHARLES L. ADAMS
RICHARD J. MC FALLS
BY Myron Amer
ATTORNEY

United States Patent Office 3,502,530
Patented Mar. 24, 1970

3,502,530
METHOD OF PRODUCING A FINISHED REINFORCED EDGE ON FLEXIBLE WEBS OR SHEETS
Charles L. Adams and Richard J. McFalls, Troy, N.Y., assignors, by mesne assignments, to Clupak, Inc., New York, N.Y., a corporation of Delaware
Continuation-in-part of application Ser. No. 221,175, Sept. 4, 1962. This application Jan. 14, 1966, Ser. No. 520,803
Int. Cl. D06c 25/00; B31f 1/12; B32b 3/02
U.S. Cl. 156—183                      4 Claims

ABSTRACT OF THE DISCLOSURE

Method of reinforcing flexible fibrous webs by strengthening the edges in an edge upsetting action in which the web is supported along a line inward of the edge to be reinforced to create an unsupported portion and then upset to create random multiple pleats and folds. The compressed edge may be held by adhesive or softening of web fibers.

---

Figure 4:
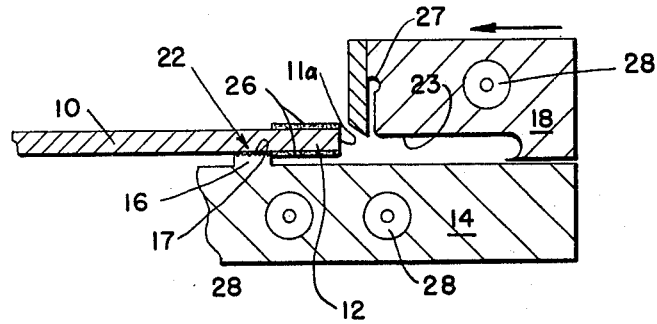

This application is a continuation-in-part of the copending application Ser. No. 221,175 filed Sept. 4, 1962, now abandoned, for a Method of Producing a Finished Reinforced Edge on Flexible Webs or Sheets, by Charles L. Adams and Richard J. McFalls.

The present invention relates generally to the strengthening of flexible webs and sheets and more particularly to reinforcing the edges of such things as handkerchiefs and wipers of various kinds, all of which are highly flexible and exhibit a high degree of drape.

There are available today, many materials which are to some extent inexpensive substitutes for most costly woven cloth materials. One of the reasons that such substitutes are not completely adequate is the fact that they have a tendency to tear at their edges. Tears tend to propagate from weak spots around the edges of the material. Therefore, it is necessary that the edges be stronger than the body material if they are to be able to resist tearing. Such things as non-woven webs and papers have all of the physical properties qualifying them for applications in the substitution for more costly woven webs except for the fact that they do not have adequate edge strength. The first need then, in providing such a sheet, for example of a tissue paper, is to strengthen the edge.

There are several known ways of reinforcing edges of materials, however, these are not practical in the instant case since they make the edge extremely stiff. Aside from being strong, a textile substitute which is to be used, for example, as a handkerchief, must be very soft, very flexible, and very pliable. It becomes readily apparent from the above that the reinforced edges necessary in this case must be a very special kind of edge. Since the item involved is going to be a substitute for an item which is more expensive, but not a great deal more expensive, the reinforced edge must be produced rapidly and at very low cost. The problem of providing such an edge is a difficult problem, but one which the present inventors have solved. The solution was not an easy one because in addition to the characteristics which such an edge must have, the problem of working with the actual material was significant, the material in each case being a very thin gossamer-like sheet or web.

The present inventors knew that a need existed for a means and apparatus which would allow strengthening the edge tear resistance of very thin, highly flexible sheets and webs without significantly impairing the over-all flexibility and drape characteristics of the web or sheet.

In view of the above, it is an object of the present invention to increase the tear resistance of the edges of non-woven webs to where it is equal to and, in many cases, superior to the inherent edge tear resistance of most woven webs.

Another object is to increase the edge tear resistance of non-woven webs without, at the same time, unduly lessening the flexibility or drapability of these webs.

To accomplish the foregoing and other objects of the present invention, the invention comprises the features hereinafter described and particularly set out in the claims, the description setting forth in detail certain illustrative embodiments of the invention. These embodiments are set out to show some of the ways in which the principles of the invention may be employed.

The methods of the present invention include in their scope, compressing the edge of the web to be reinforced inwardly upon itself and retaining this compressed edge condition so that the increased bulk thereof resists forces having a tendency to tear the edge. Using, for example, uncreped extensible paper, it is contemplated rendering the edge to be reinforced adhesive prior to compression by direct application of an adhesive along the web edge and the adjacent marginal web portion. Thus, the resulting compressed edge condition of the web is retained by solidification of this adhesive and the increased bulk provided by this compressed condition strongly resists tearing without unduly stiffening the web inwardly and along the edge.

It will, of course, be appreciated that the methods of the present invention are not limited in application to paper or to any particular non-woven web material but can also be practiced on non-woven materials comprised of synthetic fibers or combinations of natural and synthetic fibers. In fact, a non-woven web comprised substantially of synthetic fibers, such as for example rayon fibers, although more costly than a cellulosic paper web, has the advantage that an adhesive need not be applied to it prior to compression. With such a web material it is possible to subject the web edge to heat and thereby render the fibers or constituent binders adhesive by softening the fibers or constituent binders of the web.

Figure 5:
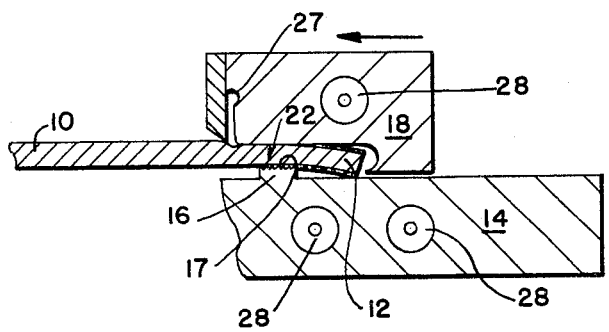
Figure 6:
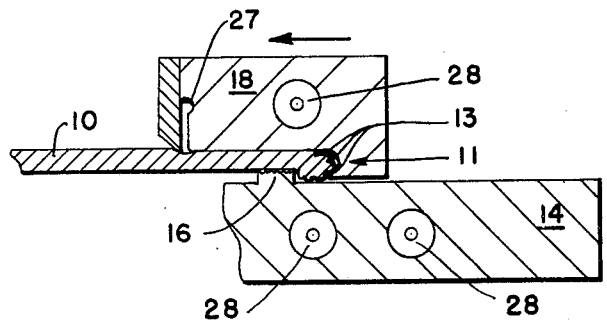

In the drawings:
FIGURE 1 is a plan view of a non-woven web having a compressed edge condition of the present invention;
FIGURE 2 is a sectional view taken along lines 2—2 of FIGURE 1;
FIGURE 3 is an isometric view of a preferred form of apparatus for applying a compressed edge to a web;
FIGURE 4 is a sectional view taken along lines 4—4 of FIGURE 3; and
FIGURES 5 and 6 are sectional views similar to FIGURE 4 illustrating the position of parts of the apparatus of FIGURE 4 during stages of its operation.

The methods of the present invention contemplate the use of a non-woven web material which except for edge tear resistance (which it is an object of this invention to improve) otherwise has all of the physical characteristics which would qualify it for use in place of a more expensive woven web material.

Using a paper non-woven material, the methods of the present invention contemplate the application of a suitable adhesive along the edge to be reinforced for the purpose of retaining said edge in its compressed condition. An example of one such suitable adhesive is a hot melt resin.

Referring now to the drawings, in FIGURES 1 and 2 there is shown a non-woven web 10, the edges 11 of which have been modified to where they have greatly improved edge tear resistance. This improved edge tear resistance is the direct result of the compressed condition of each edge by which said edge is provided with an increase in bulk capable of resisting considerable force. Furthermore, the bulk is concentrated along the web edges and has been found not to substantially decrease flexibility or the draping ability of the web 10.

Structurewise, each modified edge 11 consists of about one-quarter inch of a web marginal portion 12 compressed inwardly upon itself into rolls, pleats and folds, collectively designated 13, and retained in its compressed condition. In FIGURE 1, the left and right hand ends of the uppermost modified compressed edge 11 has been unraveled to illustrate the multiple rolls, pleats and folds 13 in its construction.

A suitable apparatus for changing the original edge 11a of the web 10 to the modified edge 11 is illustrated in FIGURES 3–6. This apparatus is relatively simple in nature such that the diagrammatic representation of said apparatus as given in FIGURES 3–6 is believed to be adequate for a complete understanding of the same. As shown, this apparatus has a stationary lower plate 14 around the periphery of which is a raised land 16 having a roughened gripping surface 17. In practice, a rectangular piece of the web 10, cut to size so it extends on all four sides beyond the raised land 16, is deposited on the lower plate 14. A pair of identically constructed angled dies 18, each powered by air cylinder 19, are then moved inwardly from opposite directions against the marginal web portion 12 overhanging the land 16 to compress this marginal web portion on all sides and produce the modified edge construction of the present invention on all four edges of the web. A best shown in phantom perspective in FIGURE 1, the two opposing corners of the precut web 10 remote from the dies 18 are provided with cut-outs 21 in order to provide neat, flush corners in the final product.

The manner by which the stationary plate 14 and movable dies 18 cooperate to apply the modified construction of the present invention to one or more edges 11a of a rectangular web piece 10 can best be understood from FIGURES 4–6. As clearly shown therein, the web piece when properly deposited on the plate 14 presents what will be understood to be approximately one-quarter inch of a marginal portion 12 of itself overhanging the land 16. Inwardly of this overhanging marginal portion 12, however, the web piece 10 is in contact with the gripping surface 17 of the land 16 as at 22, and under slight pressure is therefore held by the surface 17 of the land 16 against movement. This slight pressure is applied by the underside 23 of the leading portion of the die 18 after movement of this member inwardly on the web 10 to its position shown in FIGURE 5. It will also be appreciated from the FIGURE 5 position of the die 18 that this member and the stationary plate 14 define a cavity 24 to which movement of the marginal portion 12 is restricted. With the web 10 held against movement along the line 22 and the web portion 12 restricted to movement, only within the cavity 24, a decrease in the size of said cavity as occurs upon further inward movement of the die 18, to its final position shown in FIGURE 6, in an obvious manner causes compression of the web portion 12 into multiple rolls, pleats and folds 13 and the modification of said web portion into the improved compressed edge 11 of the present invention.

When using a paper non-woven material comprised of natural cellulosic fibers, it is necessary to have an adhesive such as a hot melt resin applied as a surface coating 26 on opposite sides of the web marginal portion 12 as best shown in FIGURE 4. During inward movement of the die 18, the surface coating 26 is then preferably rendered plastic or tacky by steam delivered through the port 27 and by the heat generated by heating elements 28 mounted in the dies 18 and plate 14. Thus, the modified compressed edge 11 is retained by solidification of the adhesive.

When using a non-woven material comprised entirely or substantially of synthetic plastic fibers, the adhesive surface covering can be dispensed with. In this case, the steam and generated heat is utilized to soften the constituent fibers and there is an interlocking and adhesive joining of fibers adjacently located in the web in the compressed edge 11 which retains this edge condition in the final product. While the methods and techniques of the present invention are not limited in application to any particular non-woven material, the following may be understood to be exemplary of those materials with which no difficulty was experienced in applying the improved modified edge construction of the present invention: 100% viscose rayon fibers; 60% cotton and 40% rayon fibers; 50% viscose rayon and 50% acetate fibers; 80% viscose rayon, 14% cotton, and 6% cellulose fibers; and 100% polyester fibers identified by the Du Pont trademark Dacron.

The modified edge of this invention exhibits flexibility due to the discontinuity of the pleats and folds of which it consists. If each fold, for example, was to be continuous along the length of the edge, the columnar effect would result in a rigid form. It is readily apparent that such an edge, though possibly quite strong, would be quite unsuitable.

The actual physical nature of this edge can be highlighted by considering the effect of various die configurations and upsetting movements. One way to form the edge of this invention is to compress the web back upon itself by moving the die (upsetting cavity) in upon the edge at a 90 degree angle to the edge. This results in random pleats and folds. Flexibility can be increased by moving the die in upon the edge at an angle, for example, 45 degrees.

In this latter case, the folds and pleats will be random but nevertheless will tend to orient themselves in non-continuous groups which run at generally a 45 degree angle to the edge within the compressed portion. In either case, the effect can be only viewed by carefully pulling and flattening the edge for purposes of inspection. Another way of achieving a flexible edge as well as achieving an enhanced esthetic effect, is to break up the folds and pleats by back-cutting the die 18. The frequency and depth of the back-cutting can be varied as well as the amount of "land" between cuts.

It will be apparent that this invention is not limited to providing edges on straight pieces. The principles of the present invention may be applied to irregular or closed edge configurations.

Although the specification is described with reference to non-wovens and paper, it should be understood that the principles of this invention would be applicable to increasing the edge strength of various other materials such as woven materials.

A non-woven web provided with a modified edge 11 of the present invention has been found to be particularly useful as a tablecloth napkin, handkerchief and similar items.

It will be understood that various changes in the details, materials, steps and arrangement of parts, which have been herein described and illustrated in order to explain the nature of the invention, may be made by those skilled in the art within the principle and scope of the invention as expressed in the appended claims.

We claim:

1. The method of increasing the resistance of an edge of a flexible fibrous web to forces having a tendency to tear said edge comprising the steps of supporting the web against movement along a line inward of the edge to be reinforced to create an unsupported portion between said line and said edge, upsetting to create multiple pleats and folds in said unsupported portion which pleats and folds are non-continuous along the length of said edge, compressing these pleats and folds in upon themselves and holding this compressed condition by means of adhesive applied at predetermined places.

2. The method of claim 1 wherein the compressed condition is held by softening at least some of the fibers of the web and subsequently allowing said fibers to harden while the pleats and folds are compressed in upon themselves.

3. The method of increasing the resistance of an edge of a flexible fibrous web to forces having a tendency to tear said edge comprising the steps of supporting the web against movement along a line inward of the edge to be reinforced to create an unsupported portion between said line and said edge, creating random multiple pleats and folds in said unsupported portion, compressing said pleats and folds in upon themselves and holding this compressed condition by means of adhesive applied at predetermined places.

4. The method of claim 3 wherein the compressed condition is held by softening at least some of the fibers of the web and subsequently allowing said fibers to harden while the pleats and folds are compressed in upon themselves.

References Cited

UNITED STATES PATENTS

| 1,611,228 | 12/1926 | Pratt | 161—118 XR |
| 1,774,497 | 8/1930 | Wandel | 161—44 |
| 1,320,692 | 11/1919 | Hulse | 161—104 |
| 2,054,917 | 9/1936 | Yunik | 264—136 |
| 2,977,633 | 4/1961 | Breitenstein | 264—94 |

FOREIGN PATENTS

| 750,252 | 3/1953 | Great Britain. |
| 803,872 | 11/1958 | Great Britain. |

ROBERT F. BURNETT, Primary Examiner

W. A. POWELL, Assistant Examiner

U.S. Cl. X.R.

55—511; 156—227, 306; 161—147, 149; 264—134, 320